US006912280B2

(12) United States Patent
Henry

(10) Patent No.: US 6,912,280 B2
(45) Date of Patent: Jun. 28, 2005

(54) KEYPAD DEVICE

(75) Inventor: Raymond C. Henry, Wake Forest, NC (US)

(73) Assignee: Sony Ericsson Mobile Communications AB (SE)

( * ) Notice: Subject to any disclaimer, the term of this patent is extended or adjusted under 35 U.S.C. 154(b) by 310 days.

(21) Appl. No.: 10/200,733

(22) Filed: Jul. 22, 2002

(65) Prior Publication Data

US 2004/0013262 A1 Jan. 22, 2004

(51) Int. Cl.[7] .................................................. H04M 1/00

(52) U.S. Cl. ........................ 379/368; 379/364; 379/365; 379/433.06; 379/433.07

(58) Field of Search ................................ 379/365–369, 379/433.07; 455/575.1, 575.3, 575.4, 575.6, 557, 365, 366, 367, 369; 200/308–317

(56) References Cited

U.S. PATENT DOCUMENTS

| | | | | |
|---|---|---|---|---|
| 4,288,787 A | | 9/1981 | Serras-Paulet | |
| 5,869,791 A | * | 2/1999 | Young | 178/20.01 |
| 5,900,829 A | * | 5/1999 | Gardner et al. | 341/26 |
| 5,971,557 A | * | 10/1999 | Kubes et al. | 362/24 |
| 6,035,180 A | * | 3/2000 | Kubes et al. | 455/575.1 |
| 6,057,517 A | * | 5/2000 | Meyer | 200/5 A |
| 6,633,241 B2 | * | 10/2003 | Kaikuranta et al. | 341/33 |
| 2002/0084721 A1 | * | 7/2002 | Walczak | 310/339 |

FOREIGN PATENT DOCUMENTS

EP 0 793 246 B1 2/1999

OTHER PUBLICATIONS

Written Opinion, PCT/US03/22792, Sony Ericsson Mobile Communications AB, Jun. 3, 2004.

* cited by examiner

*Primary Examiner*—Rexford Barnie
*Assistant Examiner*—Tuan Pham
(74) *Attorney, Agent, or Firm*—Moore & Van Allen PLLC; Gregory A. Stephens

(57) ABSTRACT

A keypad device for a mobile telephone or other device utilizing a keypad or keyboard is comprised of a flexible substrate and a keypad cover. The flexible substrate includes a plurality of keys affixed to the surface as well as a plurality first conductive strips associated with each key. The keypad cover is attached to the flexible substrate. The keypad cover typically includes holes that permit the plurality of keys to protrude through the keypad cover. In addition, the keypad cover further includes a plurality of second conductive strips that selectively contact a corresponding first conductive strip on the flexible substrate. The plurality of first conductive strips is coupled to ground and the plurality of second conductive strips is coupled to logic circuitry. Or, in another embodiment, both sets of conductive strips are coupled with the logic circuitry. The default position of the keypad device has each of the first conductive strips in contact with each of the corresponding second conductive strips. This creates a short circuit condition that prevents key signals from being received by the logic circuitry. When a particular key is depressed to the point where the first conductive strip associated with that particular key is separated from the second conductive strip corresponding to the first conductive strip, the short circuit condition is removed. This allows a signal to be transmitted to and processed by the logic circuitry indicating that a particular key has been selected.

4 Claims, 2 Drawing Sheets

KEYPAD DEVICE

BACKGROUND OF THE INVENTION

One concern in electronics design is space savings. Using less space for component(s) leads to a smaller footprint for the overall design of a product or product component. This permits an electronics product to be made smaller or more components may be added to the original footprint.

This is especially relevant to circuit board components where space is at a premium. Any conservation measures that can be applied to printed circuit boards (PCBs) are considered extremely valuable because of the resulting decreased footprint or increased density of circuit board components. Increased density yields more electronics components per unit area and that translates into increased functionality for the electronics product.

One particular electronics product that strives to decrease its physical size and increase its functional capabilities is the mobile telephone. Today's mobile telephones are sleek, ultra-thin, and ultra-lite designs when compared to the mobile telephones of a few years ago. Advancements in printed circuit board (PCB) component mounting techniques have contributed greatly to these new designs.

Finding ways to achieve additional space savings for mobile telephone designs is desirable to vendors and consumers alike. One area of mobile telephone design that impinges on usable printed circuit board (PCB) space is the keypad. Current mobile telephone keypads typically contain electrical contacts for the keys on the underside of each key. The keys are pressed down into contact with corresponding electrodes on a printed circuit. This severely limits the printed circuit board (PCB) space available for other components directly under the keypad.

The same limitations described for mobile telephone keypads also apply to other electronics devices that require a keypad or keyboard of some sort. Such other products may include, landline telephones, cordless telephones, personal digital assistants (PDAs), integrated computer products, computer laptops, pagers, etc.

What is needed is a keypad device that does not require key contacts to be mounted on a printed circuit board (PCB) in order to be detected.

BRIEF SUMMARY OF THE INVENTION

The present invention comprises a keypad design for a mobile telephone that allows the area directly beneath the keypad on the main printed circuit board (PCB) of the mobile telephone to be used for circuitry other than keypad contacts. Or, if other circuitry is not desired, the overall mobile telephone design may be compressed into a thinner profile. The present keypad design is readily extendable to electronic devices other than mobile telephones.

Instead of mounting keypad contacts to the main printed circuit board (PCB), the keypad cover is affixed with circuit rings around each key. The circuit rings then serve as the contact for a corresponding key. Thus, the keypad device is comprised of a keypad and a keypad cover that are electrically coupled to one another.

The keypad is a flexible substrate. The flexible substrate includes a plurality of keys affixed to the surface as well as a plurality first conductive strips associated with each key. The keypad cover is attached to the flexible substrate. The keypad cover also includes holes that permit the plurality of keys to protrude through the keypad cover. In addition, the keypad cover further includes a plurality of second conductive strips that selectively contact a corresponding first conductive strip on the flexible substrate.

In one embodiment, the plurality of first conductive strips is coupled to ground and the plurality of second conductive strips is coupled to logic circuitry. The connections may be reversed without altering the function of the invention. That is, the first conductive strips may be coupled to the logic circuitry and the second conductive strips may be coupled to ground. The default position of the keypad device has each of the first conductive strips in contact with each of the corresponding second conductive strips. This creates a short circuit condition that prevents key signals from being received by the logic circuitry.

When a particular key is depressed to the point where the first conductive strip associated with that particular key is separated from the second conductive strip corresponding to the first conductive strip, the short circuit condition is removed. This allows a signal to be transmitted to and processed by the logic circuitry indicating that a particular key has been selected.

In another embodiment, the plurality of first conductive strips and the plurality of second conductive strips are coupled to logic circuitry. The default position of the keypad device has each of the first conductive strips in contact with each of the corresponding second conductive strips. The plurality of first conductive strips and the plurality of second conductive strips are oriented as a two-dimensional matrix. The first conductive strips are organized into the rows of the matrix while the second conductive strips are organized into the columns of the matrix. Each row of the matrix is further coupled to a resistor/power source combination that is set at a positive voltage. Each column of the matrix is alternately pulled to ground. This creates a short circuit condition that prevents key signals from being perceived by the logic circuitry.

When a particular key on the column currently pulled to ground is depressed to the point where the first conductive strip associated with that particular key is separated from the second conductive strip corresponding to the first conductive strip, the short circuit condition for that key is removed. The resistor/power source now registers a high on the row indicating that a particular key has been selected. Since only one column may be active at any given moment, the exact key that has been depressed is determined by knowing the active column and row.

DETAILED DESCRIPTION OF THE INVENTION

Figure 1:
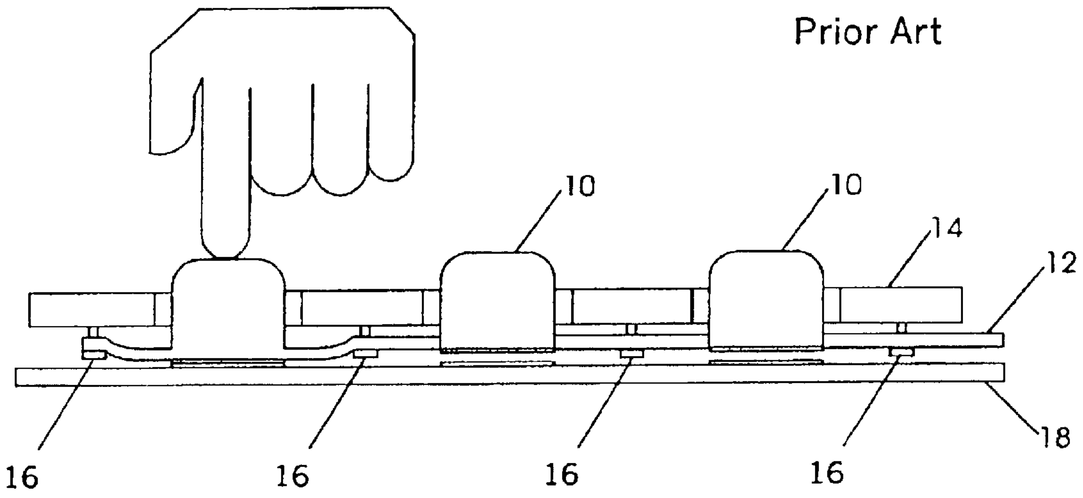
FIG. 1 Prior Art
FIG. 1 illustrates a typical prior art mobile telephone keypad design.

FIG. 1 illustrates a typical prior art mobile telephone keypad design. The keypad design comprises a keypad including a plurality of keys 10 that are mounted to a flexible substrate 12. The flexible substrate 12 is coupled with the cover of the mobile telephone 14 which holds the keys in place and exposes the keys for depression from an external force such as a finger depression. The interior surface of the cover of the mobile telephone 14 and the flexible substrate 12 are spaced apart slightly and coupled via a plurality of stand-offs 16. A standoff is typically a plastic pin or other material that secures the flexible substrate 12 to the mobile telephone cover 14 at a fixed distance. The entire keypad device is positioned above a printed circuit board (PCB) 18. The underside surface of each key 10 is comprised of, or coated with, a conductive material such that when a key 10 is depressed it comes into contact with the printed circuit board (PCB) 18 completing a circuit and indicating that the key has been depressed. This design requires that the printed circuit board (PCB) 18 be used in conjunction with the keypad. Thus, the area on the printed circuit board (PCB) 18 directly beneath the keypad is unusable for other components.

Figure 2A:
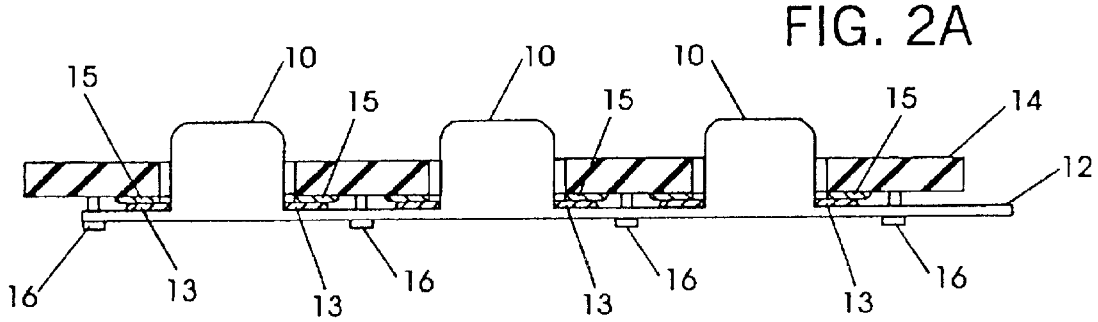
FIG. 2A illustrates a keypad design according to the present invention with the illustrated keys in a closed position.

FIG. 2A illustrates a keypad device according to the present invention with the illustrated keys in a closed position. The closed position is the default position. The present invention keypad device 20 comprises a keypad including a plurality of keys 10 that are mounted to a flexible substrate 12. The flexible substrate 12 is coupled with the cover of the mobile telephone 14 which holds the keys in place and exposes the keys for depression from an external force such as a finger depression. The flexible substrate 12 further includes electrically conductive strip contacts 13 on the upper surface of the flexible substrate 12 that surround each key 10. These conductive strip contacts 13 are all coupled to ground. Moreover, the interior surface of the cover of the mobile telephone 14 is laminated (or otherwise affixed) with electrically conductive strip contacts 15 that directly correspond to the electrically conductive strip contacts 13 on the upper surface of the flexible substrate 12. The interior surface of the cover of the mobile telephone 14 and the flexible substrate are tightly coupled via a plurality of stand-offs 16. The tight coupling ensures that the conductive strip contacts 15 affixed to the interior surface of the cover of the mobile telephone 14 and the conductive strip contacts 13 on the surface of the flexible substrate 12 remain in contact in the default position. Since the conductive strip contacts 13 on the surface of the flexible substrate 12 are coupled to ground, the conductive strip contacts 15 laminated to the interior surface of the cover of the mobile telephone 14 are shorted out.

Figure 2B:
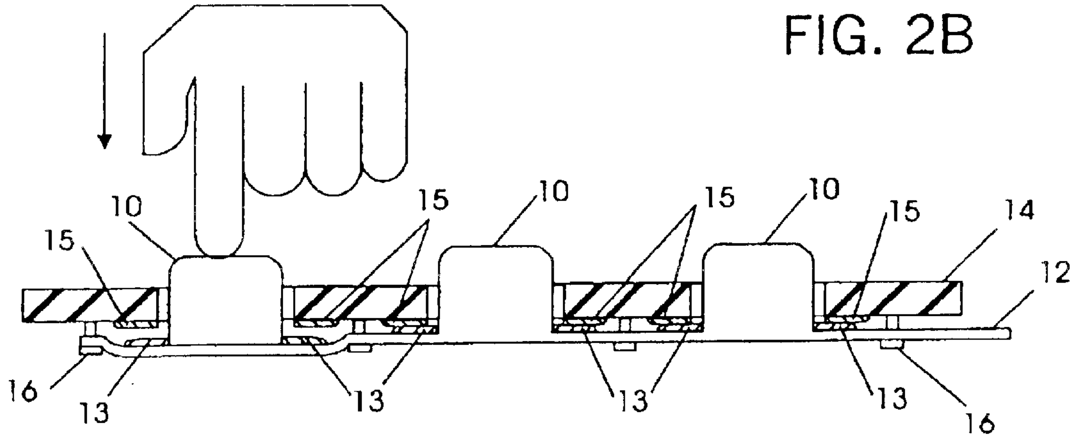
FIG. 2B illustrates a keypad design according to the present invention with one of the illustrated keys in an open position.

FIG. 2B illustrates a keypad design according to the present invention with one of the illustrated keys in an open position. When a key 10 is depressed, the conductive strip contact 13 corresponding to that key is separated from the conductive strip contact 15 on the interior surface of the cover of the mobile telephone 14. This action removes the short circuit of the default key position creating a signal that is sent to circuit logic indicating that a specific key has been depressed.

Figure 3:
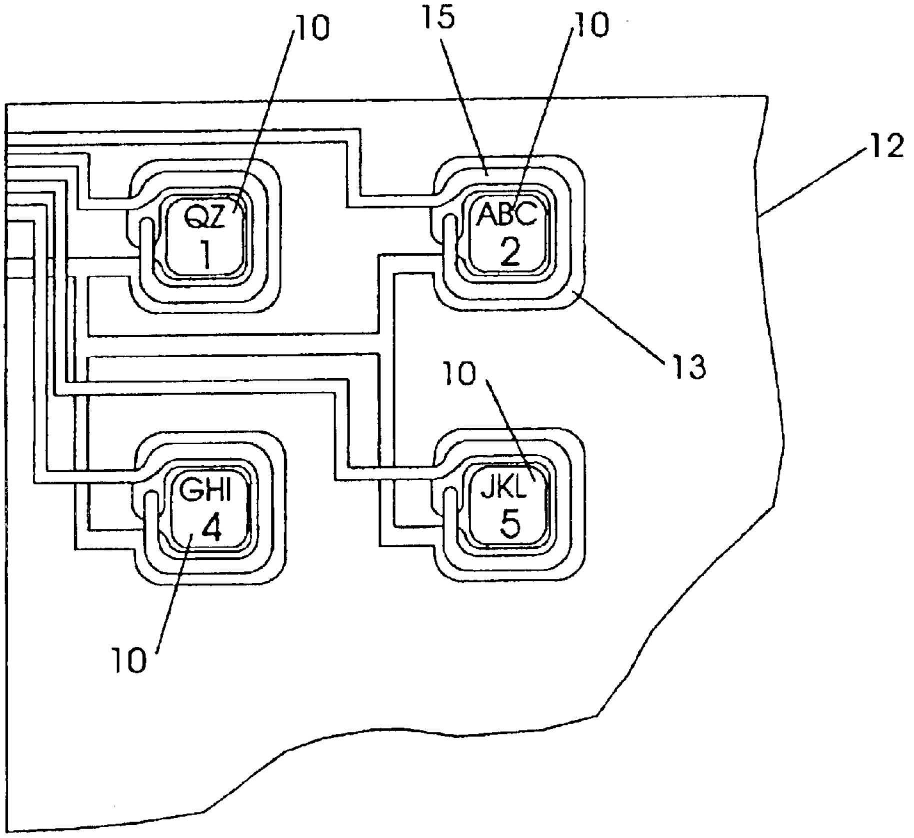
FIG. 3 illustrates a circuit layout for one embodiment of the keypad of FIGS. 2A and 2B.

FIG. 3 illustrates a cut-away view of a portion of a circuit layout for one embodiment of the keypad of FIGS. 2A and 2B. Several keys 10 are illustrated that are attached to a flexible substrate 12. About each key 10 is a pair of contacting conductive strips that are stacked upon each other. The inner ring is the conductive strip contact 15 on the interior surface of the cover of the mobile telephone. The mobile telephone cover is not shown in FIG. 3 so that the conductive rings can better be viewed. In actuality, this conductive strip 15 would be affixed to the inside surface of the cover of the mobile telephone. The outer ring is the conductive strip contact 13 on the surface of the flexible substrate 12. This conductive strip 13 is coupled with ground. Each of the inner ring conductive strip contacts 15 are capable of transmitting signals to a logic circuit responsible for interpreting key presses. A signal will only be transmitted, however, when a key 10 is depressed to the point where the outer ring conductive strip contact 13 has been separated from the inner ring conductive strip 15 removing the short circuit condition.

The foregoing disclosure has described the conductive strip contact 13 on the surface of the flexible substrate 12 as being coupled with ground while the conductive strip contact 15 on the interior surface of the cover of the mobile telephone as being coupled with logic circuitry. This configuration creates the short circuit condition for the default state of the keypad. These couplings can be reversed, however, without affecting the functionality of the present invention. That is to say, the conductive strip contact 15 on the interior surface of the cover of the mobile telephone could be coupled to ground while the conductive strip contact 13 on the surface of the flexible substrate 12 could be coupled with logic circuitry. Either way, the depression of a key breaks the short circuit allowing a signal indicating a key has been pressed to be passed to the appropriate logic circuitry.

Figure 4:
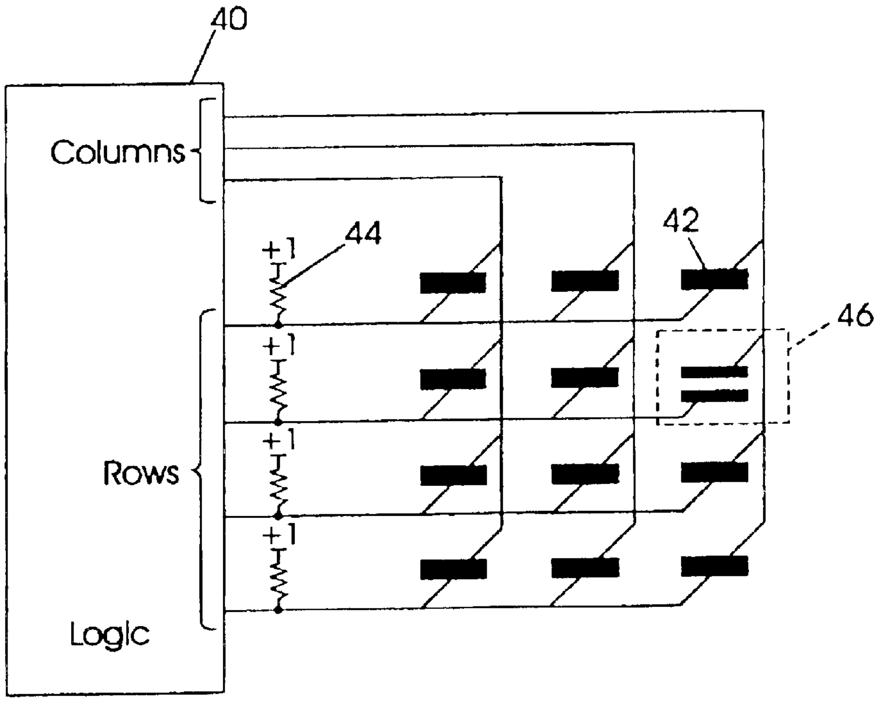
FIG. 4 illustrates a circuit layout for another embodiment of the keypad of FIGS. 2A and 2B.

FIG. 4 illustrates a logic circuit layout for another embodiment of the keypad of FIGS. 2A and 2B. A logic circuit 40 includes leads that connect to the plurality of first conductive strips and the plurality of second conductive strips associated with each key 42. Just as before, the default position of the keypad device has each of the first conductive strips for a particular key in contact with a corresponding second conductive strip for the same key. In this embodiment, the plurality of first conductive strips and the plurality of second conductive strips are oriented as a two-dimensional matrix. The first conductive strips are organized into the rows of the matrix while the second conductive strips are organized into the columns of the matrix. This is arbitrary in that the second conductive strips may be organized into the rows of the matrix while the first conductive strips may be organized into the columns of the matrix.

Each row of the matrix is further coupled to a resistor/power source combination 44 that is set at a positive voltage. The logic circuitry alternately pulls each column of the matrix to ground. This creates a short circuit condition for the default keypad position that prevents key signals from being perceived by the logic circuitry. When a particular key 46 on a column currently pulled to ground is depressed to the point where the first conductive strip is separated from the second conductive strip, the short circuit condition for that key is removed. The logic circuitry 40 now perceives a "high" from the resistor/power source combination 44 on that key's row indicating that a key has been selected. Since only one column may be active at any given moment, the exact key 46 that has been depressed is determined by knowing the active column and the row that is registering a "high".

The process of having the logic circuitry 40 alternately pull the columns to ground is called keypad scanning. Keypad scanning is an ongoing process used to determine which, if any, keys 42 are being depressed.

The same limitations described for mobile telephone keypads above also apply to other electronics devices that require a keypad or keyboard of some sort. Thus, the keypad device described above is readily adaptable and implementable in numerous other products. Such other products may include, landline telephones, cordless telephones, personal digital assistants (PDAs), integrated computer products, computer laptops, wristwatch keypad devices, pagers, or any other electronics product that includes keys or buttons that must be depressed.

While the present invention is described herein in the context of a mobile telephone, the term "mobile telephone" may include a cellular radiotelephone with or without a multi-line display; a Personal Communications System (PCS) terminal that may combine a cellular telephone with data processing, facsimile and data communications capabilities; a Personal Digital Assistant (PDA) that can include a radiotelephone, pager, Internet/intranet access, Web browser, organizer, calendar and/or a global positioning system (GPS) receiver; and a conventional laptop and/or palmtop receiver or other computer system that includes a display for GUI. Mobile telephones may also be referred to as "pervasive computing" devices.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

What is claimed is:

1. A keypad device comprising:

a flexible substrate having a plurality of keys affixed thereon and further comprising a plurality first conductive strips wherein each first conductive strip is associated with one of said plurality of keys; and a keypad cover attached to said flexible substrate, said keypad cover comprising a plurality of second conductive strips wherein each second conductive strip selectively contacts a corresponding first conductive strip on the flexible substrate, wherein the default position of the keypad device is closed wherein each first conductive strip associated with a key is in contact with its corresponding second conductive strip, and the plurality of first conductive strips is coupled to ground and the plurality of second conductive strips is coupled to logic circuitry such that when a key is depressed to the point that the first conductive strip associated with the key is separated from the second conductive strip corresponding to the first conductive strip, the short circuit condition is removed allowing a signal to be transmitted to said logic circuitry indicating that the key has been depressed.

2. A keypad device comprising:

a flexible substrate having a plurality of keys affixed thereon and further comprising a plurality first conductive strips wherein each first conductive strip is associated with one of said plurality of keys; and a keypad cover attached to said flexible substrate, said keypad cover comprising a plurality of second conductive strips wherein each second conductive strip selectively contacts a corresponding first conductive strip on the flexible substrate, wherein the default position of the keypad device is closed wherein each first conductive strip associated with a key is in contact with its corresponding second conductive strip, and the plurality of second conductive strips is coupled to ground and the plurality of first conductive strips is coupled to logic circuitry such that when a key is depressed to the point that the first conductive strip associated with the key is separated from the second conductive strip corresponding to the first conductive strip, the short circuit condition is removed allowing a signal to be transmitted to said logic circuitry indicating that the key has been depressed.

3. A keypad device comprising:

a flexible substrate having a plurality of keys affixed thereon and further comprising a plurality first conductive strips wherein each first conductive strip is associated with one of said plurality of keys; and a keypad cover attached to said flexible substrate, said keypad cover comprising a plurality of second conductive strips wherein each second conductive strip selectively contacts a corresponding first conductive strip on the flexible substrate, wherein the default position of the keypad device is closed wherein each first conductive strip associated with a key is in contact with its corresponding second conductive strip and the plurality of first conductive strips and the plurality of second conductive strips are both coupled to logic circuitry and logically oriented into a matrix of rows and columns such that the plurality of first conductive strips comprise the rows and the plurality of second conductive strips comprise the columns, and each row further comprises a resistor/power source combination set to a positive voltage corresponding to a high condition such that each column is alternately pulled to ground creating a short circuit condition for all keys in the default position, and when a key on a column pulled to ground is depressed to the point that the first conductive strip associated with the key is separated from its corresponding second conductive strip, the short circuit condition is removed allowing the high condition for that key's row to be transmitted to said logic circuitry indicating that a key has been depressed.

4. The keypad device of claim 3 wherein the exact key that has been depressed is determined by mapping the column currently pulled to ground to the row that exhibits a high condition.

* * * * *